US010730138B2

(12) United States Patent
Rosso et al.

(10) Patent No.: US 10,730,138 B2
(45) Date of Patent: Aug. 4, 2020

(54) DIRECT WRITING NOZZLE SYSTEM FOR ADDITIVE MANUFACTURING

(71) Applicant: LAWRENCE LIVERMORE NATIONAL SECURITY, LLC, Livermore, CA (US)

(72) Inventors: Paul A. Rosso, Livermore, CA (US); Joshua D. Kuntz, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 968 days.

(21) Appl. No.: 15/208,829

(22) Filed: Jul. 13, 2016

(65) Prior Publication Data
US 2018/0015567 A1 Jan. 18, 2018

(51) Int. Cl.
*B23K 20/26* (2006.01)
*B33Y 10/00* (2015.01)
*B33Y 30/00* (2015.01)
*B29C 64/106* (2017.01)
*B29C 64/209* (2017.01)

(52) U.S. Cl.
CPC ............ *B23K 20/26* (2013.01); *B29C 64/106* (2017.08); *B29C 64/209* (2017.08); *B33Y 10/00* (2014.12); *B33Y 30/00* (2014.12)

(58) Field of Classification Search
CPC ..... B23K 20/26; B29C 64/209; B29C 64/106; B33Y 10/00; B33Y 30/00
See application file for complete search history.

(56) References Cited

U.S. PATENT DOCUMENTS

| 6,210,030 B1* | 4/2001 | Ibar | B01F 7/00775 366/78 |
| 2016/0067918 A1* | 3/2016 | Millar | B29C 64/106 264/401 |
| 2016/0325498 A1* | 11/2016 | Gelbart | B22D 23/003 |
| 2018/0370117 A1* | 12/2018 | Gardiner | B33Y 10/00 |

FOREIGN PATENT DOCUMENTS

EP 0372376 A2 * 6/1990 ............. B23Q 5/027

OTHER PUBLICATIONS

EP0372376—machine translation (Year: 1990).*

* cited by examiner

*Primary Examiner* — John A Hevey
(74) *Attorney, Agent, or Firm* — Eddie E. Scott

(57) ABSTRACT

A nozzle apparatus used for extruding a material includes an internal spindle that imparts motion into the extruding material, the internal spindle having a base; a multiple degree-of-freedom pivot at the base of the internal spindle, and a drive mechanism that controls the motion of the internal spindle. In one embodiment the material is a semi-solid metal or alloy. In another embodiment the material is a shear thinning mixture or material. In yet embodiment the material is a thixotropic mixture or material. The nozzle apparatus can be used for making a three-dimensional object with the steps of providing a material; providing a nozzle that extrudes the material, the nozzle having an internal spindle that imparts motion into the material; positioning the nozzle above a support structure; and moving the nozzle in a three-dimensional pattern while extruding the material through the nozzle onto the support structure or onto the material previously deposited.

7 Claims, 6 Drawing Sheets

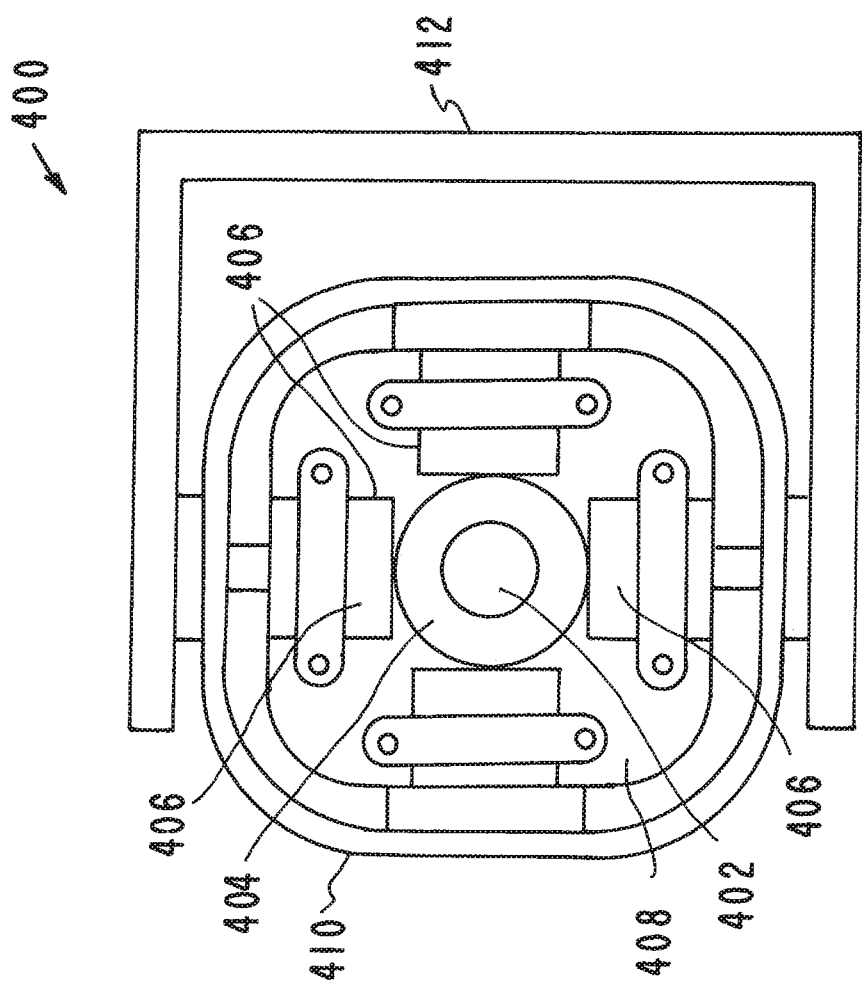

DIRECT WRITING NOZZLE SYSTEM FOR ADDITIVE MANUFACTURING

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to a direct writing nozzle system for additive manufacturing.

State of Technology

This section provides background information related to the present disclosure which is not necessarily prior art.

U.S. Published Patent Application No. 2016/0067981 for methods and systems for making a three-dimensional object includes the state of technology information below.

Disclosed herein are methods of making a three-dimensional object. The method includes positioning a nozzle of an additive manufacturing device above a support platform; extruding a teed material through the nozzle and onto the platform; and moving the nozzle in a three-dimensional pattern, while depositing the feed material, thereby forming the three-dimensional object upon the support platform. In some embodiments, the additive manufacturing device is a freeform additive manufacturing device. In some embodiments, the nozzle is stationary and the support platform moves in the three-dimensional pattern.

The material properties of extruded materials depend commonly upon temperature, especially the fluid property viscosity. Additionally, viscosity may be affected by fluid strain, exhibiting shear-thinning or shear-thickening behavior. The rate of fluid strain may also affect viscosity in the example of thixotropic materials. The methods disclosed herein provide means of imparting fluid strain at constant or varying rates into a material being extruded thru a nozzle, the material viscosity and time rate of change of viscosity having a correlation to extrusion parameters.

In some embodiments, the extruded material must be maintained in an inert environment enclosure, for example to prevent oxidation of an extruding liquid metal or alloy. To impart fluid strain using direct mechanical means, a sealing strategy must be robust to maintain material separation from an exterior environment source of oxidation or other contaminates. For the extrusion of liquid metals and alloys the temperatures required may render typical sealing materials unusable. Embodiments described herein solve sealing material limitations when mixing and/or agitation means require mechanical feedthrough access to the inert extruded material enclosure.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The disclosed apparatus, systems, and methods provide a nozzle apparatus used for extruding a material. The nozzle apparatus includes an internal spindle that imparts motion into the extruding material, the internal spindle having a base; a multiple degree-of-freedom pivot at the base of the internal spindle, and a drive mechanism that controls the motion of the internal spindle. In one embodiment the material is a semi-solid metal or alloy. In another embodiment the material is a shear thinning mixture or material. In yet another embodiment the material is a thixotropic mixture or material. The nozzle apparatus can be used for making a three-dimensional object with the steps of providing a material; providing a nozzle that extrudes the material, the nozzle having an internal spindle that imparts motion into the material; positioning the nozzle above a support structure; and moving the nozzle in a three-dimensional pattern while extruding the material through the nozzle onto the support structure or onto the material previously deposited.

In one or more embodiments the inventor's apparatus, systems, and methods relate to additive manufacturing including Direct Metal Writing (DMW) which involves the extrusion of a semi-solid or liquid metal or alloy through a nozzle. There is a need to control the viscosity of the semi-solid or liquid metal materials. The inventor's apparatus, systems, and methods provide agitation/fluid strain during extrusion. The rate of agitation/fluid strain provides control over the extruded material viscosity and thus its extrusion rate and/or force required and the extruding/printing parameters.

Additionally, the inventor's apparatus, systems, and methods solve the inherent nature of shear-thinning and thixotropic fluids to absorb most/all of the shear strain within the fluid boundary layer next to stationary and rotating/moving agitating bodies. The inventor's apparatus provides for a means to more effectively shear and add strain energy throughout the bulk of the extruding material within the nozzle. The inventor's apparatus, systems, and methods have use for the additive manufacturing of shear-thinning and thixotropic fluid media, especially pure metals and metal alloys, or any fluid benefitting from stirring/agitation during extrusion.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 3A and 313 are enlarged views of the mandrel portion of the print head shown in FIGS. 1 and 2.

FIG. 4 illustrates an embodiment with a gimbal drive.

DETAILED DESCRIPTION OF SPECIFIC EMBODIMENTS

Figure 1:
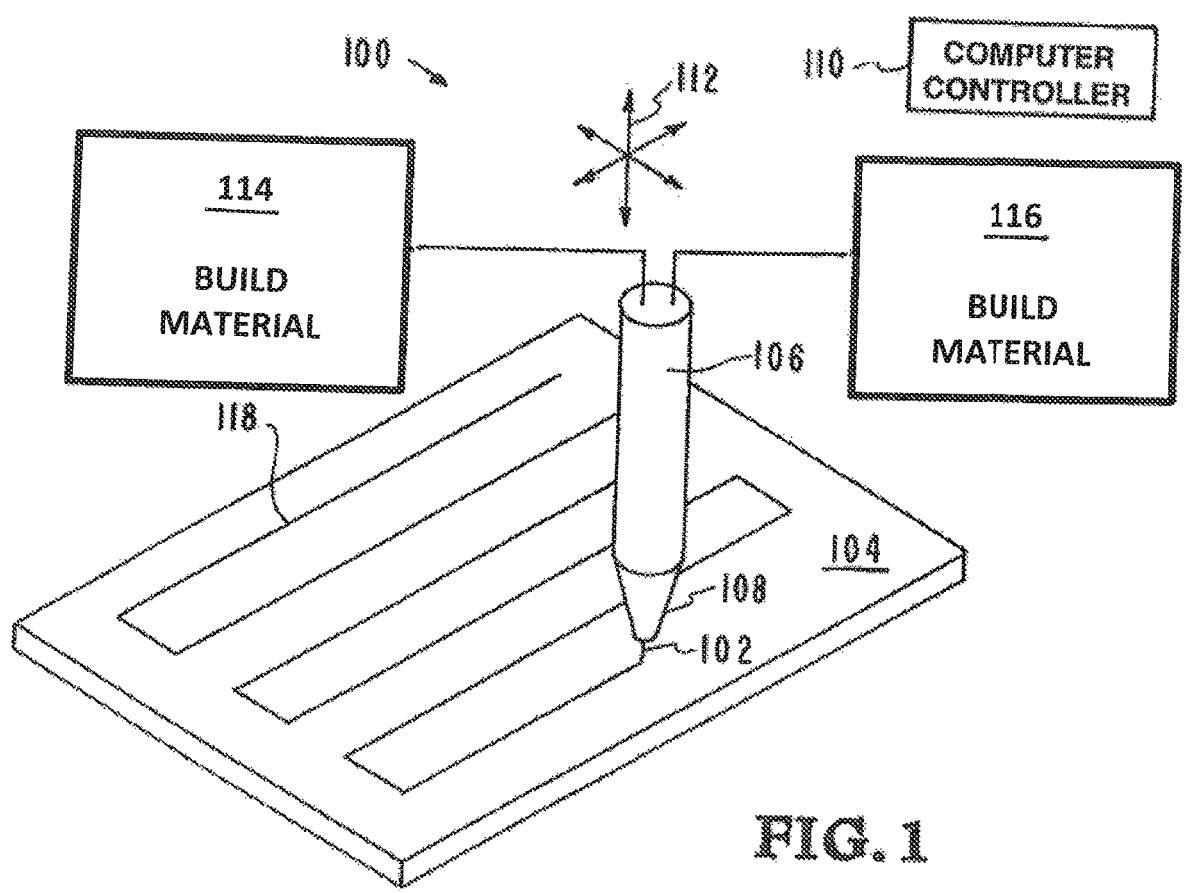
FIG. 1 illustrates one embodiment of the inventor's apparatus, systems, and methods.

There are a variety of materials being used for additive manufacturing today. In various embodiments the inventors' apparatus, systems, and methods relate to the use of shear-thinning and/or thixotropic materials or materials requiring mixing during extrusion. Printable fluid agitation is disclosed herein which provides shear strain rate input throughout the fluid volume while simultaneously solving design difficulties associated with elevated temperatures (i.e., Direct Metal Writing) and printable fluid volume sealing.

A variety of physical properties can change as printable media cools. Some of these physical changes to the media can cause problems in and additive manufacturing system. A primary example is metal media and the formation of dendrites as the liquid metal cools inside the nozzle. Breaking up and/or hindering the formation of dendrites is essential to maintaining a controllable extrusion through an additive manufacturing nozzle.

The inventors' apparatus, systems, and methods also have uses other than in additive manufacturing. One example is for the extrusion of cosmetic products (e.g., into their packaging container) which are commonly thixotropic materials. Another example is for the extrusion of toothpaste. An additional example is in loud processing equipment, such as systems for extruding shear-thickening (e.g., cornstarch) food stuffs and allowing the ability to tune the rate of extrusion via spindle rate of motion. Polymer and Foam extrusion are another example of (shear-thinning) extrusions. The foam rubber insulation linings around car doors can be extruded from a single nozzle that would benefit from added control over the instantaneous viscosity via the inventors' apparatus, systems, and methods concepts.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Figure 2:
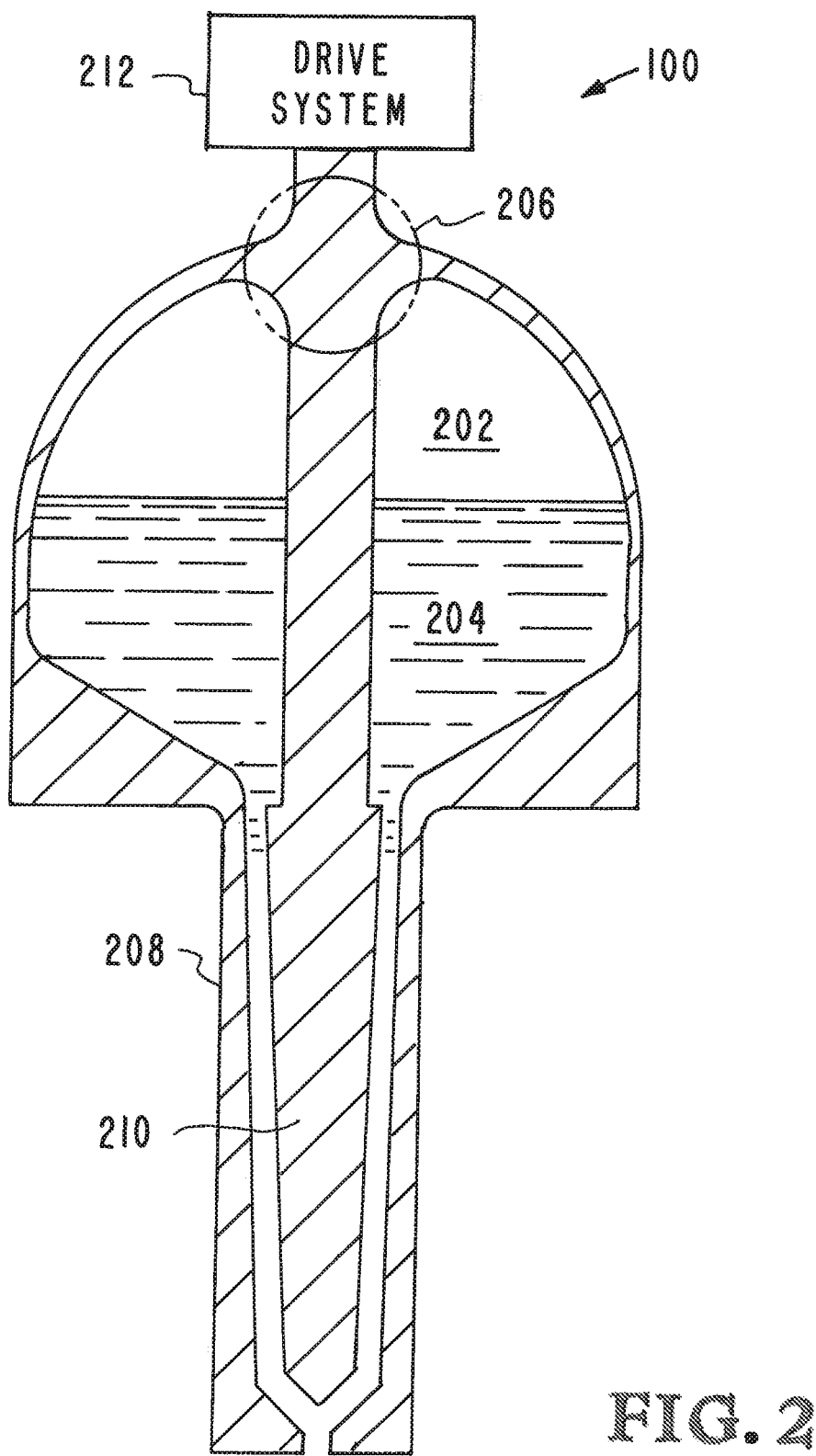
FIG. 2 is a cut away view of the print head shown in FIG. 1.

Referring now to the drawings and in particular to FIGS. 1 and 2, an embodiment of the inventor's apparatus, systems, and methods is shown. The embodiment is designated generally by the reference numeral 100. The embodiment 100 provides apparatus, systems, and methods for 3D printing and otherwise additively manufacturing that includes the use of shear-thinning and/or thixotropic materials or materials requiring mixing and/or affected by shear strain rate agitation during extrusion to make a three-dimensional object. Additive processes are used wherein successive layers of material are laid down under computer control. The three-dimensional objects can be of almost any shape or geometry and can be produced from a model or other electronic data source.

As illustrated in FIG. 1, extruded material 102 composed of shear-thinning and/or thixotropic materials or materials requiring mixing and/or affected by shear strain rate agitation during nozzle extrusion are deposited on a surface 104 to be printed by print head 106. The shear-thinning and/or thixotropic materials or materials are fed into the print head 106. The print head 106 has a nozzle 108 for extruding the shear-thinning and/or thixotropic materials or materials requiring mixing onto the surface 104. A source of build material 114 and potential additional sources of build material 116 are connected to the print head 106. The build materials 114 and 116 are shear-thinning and/or thixotropic materials, become shear thinning and/or thixotropic once mixed, and/or materials requiring mixing or agitation during nozzle extrusion. Movement of the print head 106 is controlled by computer controller 110 which provides freedom of movement along all axes as indicated by the arrows 112. Instructions and information about the product 118 to be created by the system 100 is fed to the computer controller 110 with the widely used numerical control programming language G-Code. The computer controller 110 uses the instructions to move the print head 106 through a series of movements along the surface 104 forming the product 118 to be created by the system 100.

Referring now to FIG. 2 additional details of the embodiment 100, the print head 106, and nozzle system 108 are provided. FIG. 2 is a cut away view of a portion of print head 106 and the nozzle system 108. The Drive System 212 provides direct motion of the agitating body 210 (referred to as a spindle) into a specified pattern. If the specified motion pattern of the spindle 210 is circular, then that motion, when viewed as a section cut perpendicular to the nozzle axis, is similar to that of a peristaltic pump, forcing bulk fluid motion. This bulk motion produces shear strain rates throughout the fluid volume rather than preferentially in boundary layers.

Referring again to FIG. 2 the print head 106 and nozzle system 108 provides direct motion of the agitating body (referred to as a spindle 210) into a non-rotating circular pattern. A build material chamber 202 connected to the print head and nozzle system contains build material 204. The build material 204 are shear-thinning and/or thixotropic materials and/or materials requiring mixing/agitation during nozzle extrusion. A flexure unit 206 provides an interface between the spindle 210 and the nozzle 208. The flexure unit 206 is designated by the dotted line circle and will be illustrated and described in greater detail subsequently. A dive system 212 is connected to the flexure unit 206.

Figure 3A:
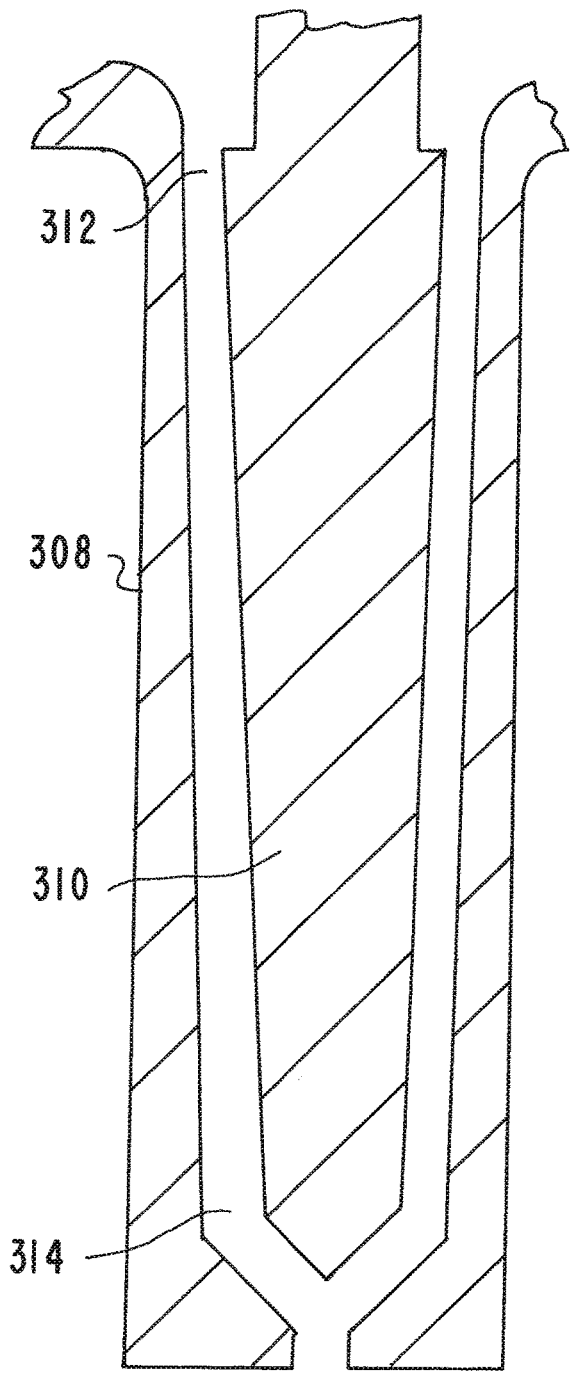
Figure 3B:
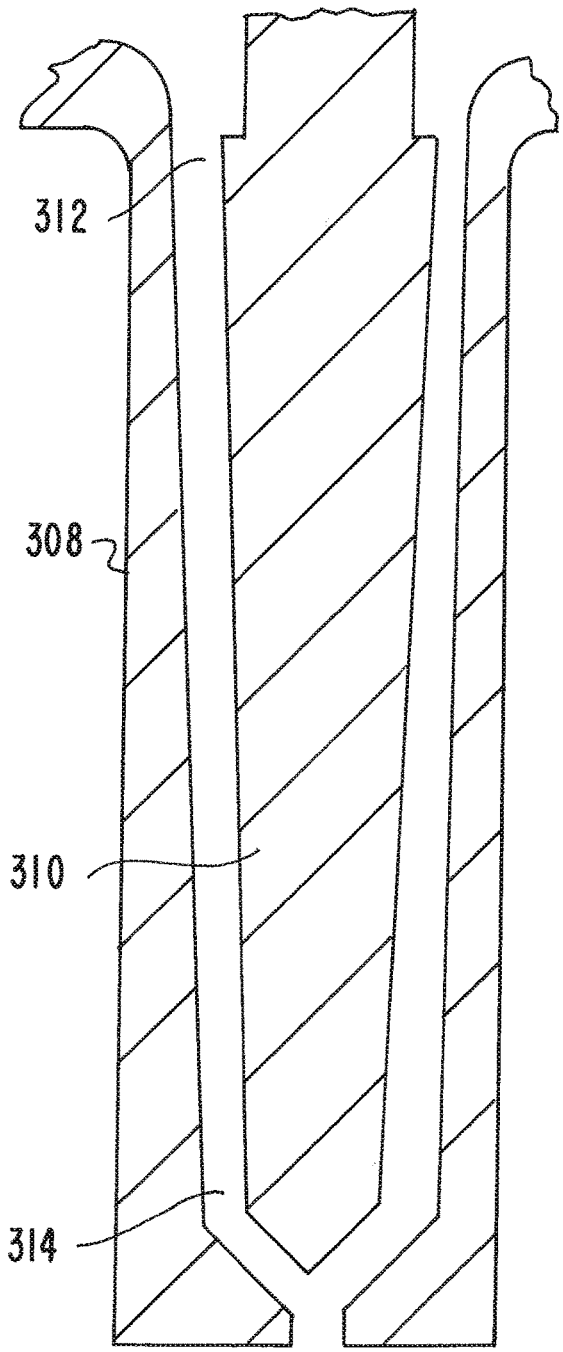

Referring now to FIGS. 3A and 3B, a cut away view of a portion of print head and the nozzle system is shown illustrating movement of the internal spindle 310 that imparts motion into the extruding material 314. The extruding material 314 is located in the area between the spindle 310 and the nozzle 308. The spindle 310 and the nozzle 308 provide direct motion into a non-rotating circular pattern. This motion is similar to that of a peristaltic pump, forcing bulk fluid motion. This bulk motion produces shear strain rates throughout the fluid volume rather than preferentially in boundary layers.

The area between spindle 310 and nozzle 308 varies along the length of the spindle 310 and nozzle 308. Movement of the spindle 310 within the nozzle 308 is in a non-rotating circular pattern. This is illustrated by FIGS. 3A and 3B that illustrates the gaps 312 and 314 between the spindle 310 and the nozzle 308. In FIG. 3A the gap 314 is larger than the gap 314 shown in FIG. 3B. The amount of fluid strain imparted to the extruding material is dependent upon the change in gap size and the rate of change of gap size. This gap size is affected by the relative diameters of the nozzle 308 and spindle 310.

The area between spindle 310 and nozzle 308 varies along the length of the spindle 310 and nozzle 308 as measured from the pivot at the top of the spindle to vary or maintain the ratio of largest and smallest gap size at any location along the extrusion path during spindle motion. Thus, the diameter of the spindle 310 varies as a function of length from the pivot. The diameter of the nozzle 308 varies as a function of length from the pivot. This system 100 agitates the fluid without rotating or sliding interfaces; this allows a solid uninterrupted vessel to surround the fluid. This prevents the need for moving sealing interfaces and also allows the use of materials that can withstand the elevated temperatures required to melt metals and alloys that would be used in Direct Metal Writing systems.

Referring again to the drawings, the drive system 212 shown in FIG. 2 imparts movement of the internal spindle 210 that in turn imparts motion into the extruding material. The extruded material is composed of shear-thinning and/or thixotropic materials or materials requiring mixing/agitation during nozzle extrusion. The extruding material is located in the area between the spindle 210 and the nozzle 208. The spindle actuated into a circular pattern and the stationary nozzle provides direct motion into the extruding material. This motion is similar to that of a peristaltic pump, forcing bulk fluid motion. This bulk motion produces shear strain rates throughout the fluid volume rather than preferentially in boundary layers.

FIG. 4 illustrates one version of the drive system. This version of the drive system is designated generally by the reference numeral 400. The drive system 400 includes spindle 402, solenoid core assembly 404 which directs a solenoid core component into each of the four solenoid bodies 406, inner gamble 408, outer gamble 410, and frame 412. The drive system 400 provides movement of the spindle 402 within the nozzle in a non-rotating circular pattern. The drive system 400 agitates the fluid without rotating or sliding interfaces; this allows a solid uninterrupted vessel to surround the fluid, especially a vessel void of moving sealing interfaces and made of material able to withstand the elevated temperatures required to melt metals and alloys that would be used in Direct Metal Writing systems.

Figure 5:
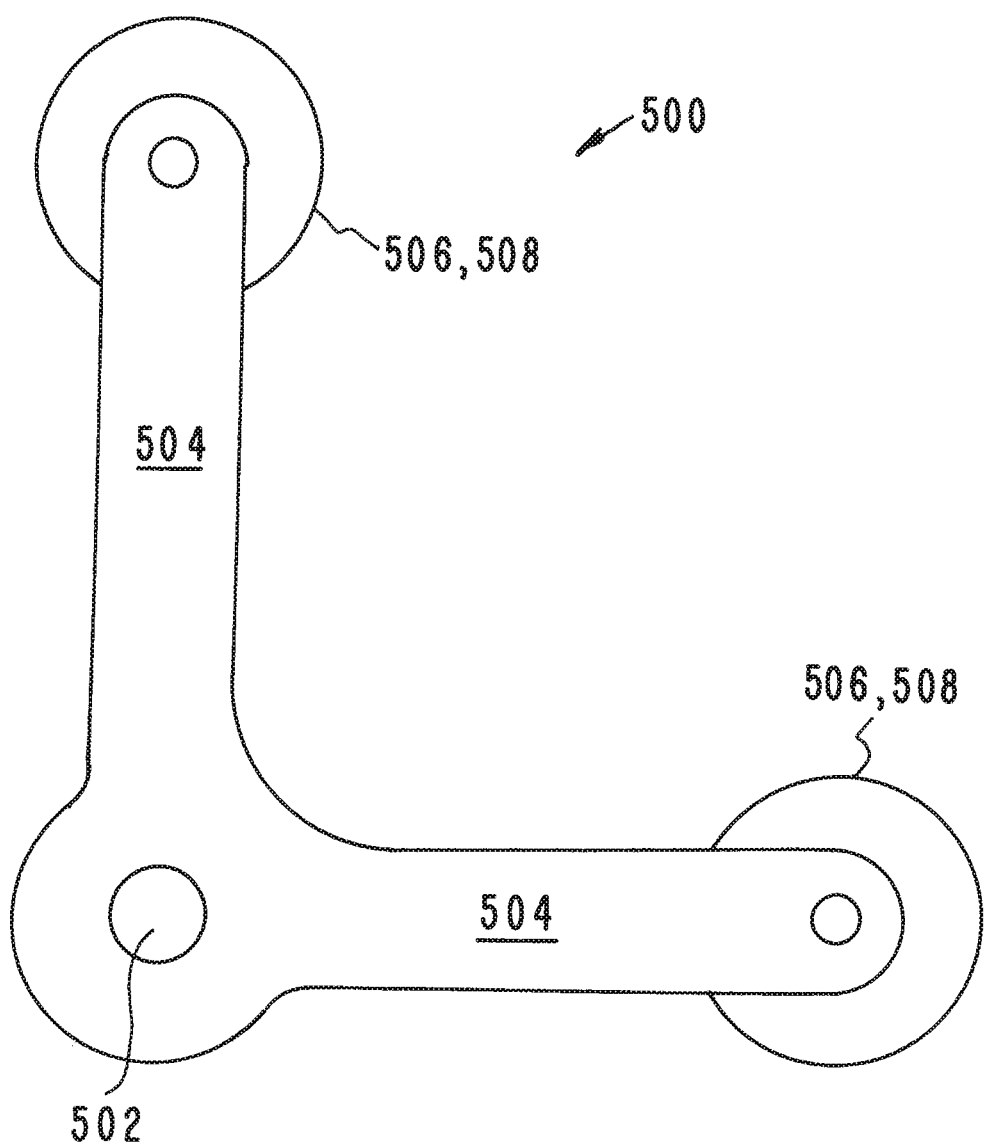
FIG. 5 illustrates an embodiment with a two motor eccentric drive.

Referring now to FIG. 5 another version of the drive system is illustrated. This version of the drive system is designated generally by the reference numeral 500. The drive system 500 includes spindle 502, links 504, stepper motors 506, and eccentric hubs 508. The extruded material is composed of shear-thinning and/or thixotropic materials or materials requiring mixing/agitating during nozzle extrusion. The extruding material is located in the area between the spindle and the nozzle. The moving spindle and the stationary nozzle provide direct motion into the extruded material. This motion is similar to that of a peristaltic pump, forcing bulk fluid motion. This bulk motion produces shear strain rates throughout the fluid volume rather than preferentially in fluid boundary layers. The drive system 500 provides movement of the spindle 502 within the nozzle in a non-rotating circular pattern. The drive system 500 agitates the extruded material without rotating or sliding interfaces; this allows a solid uninterrupted vessel to surround the fluid, especially a vessel void of moving sealing interfaces and made of material able to withstand the elevated temperatures required to melt metals and alloys that would be used in Direct Metal Writing systems.

Figure 6:
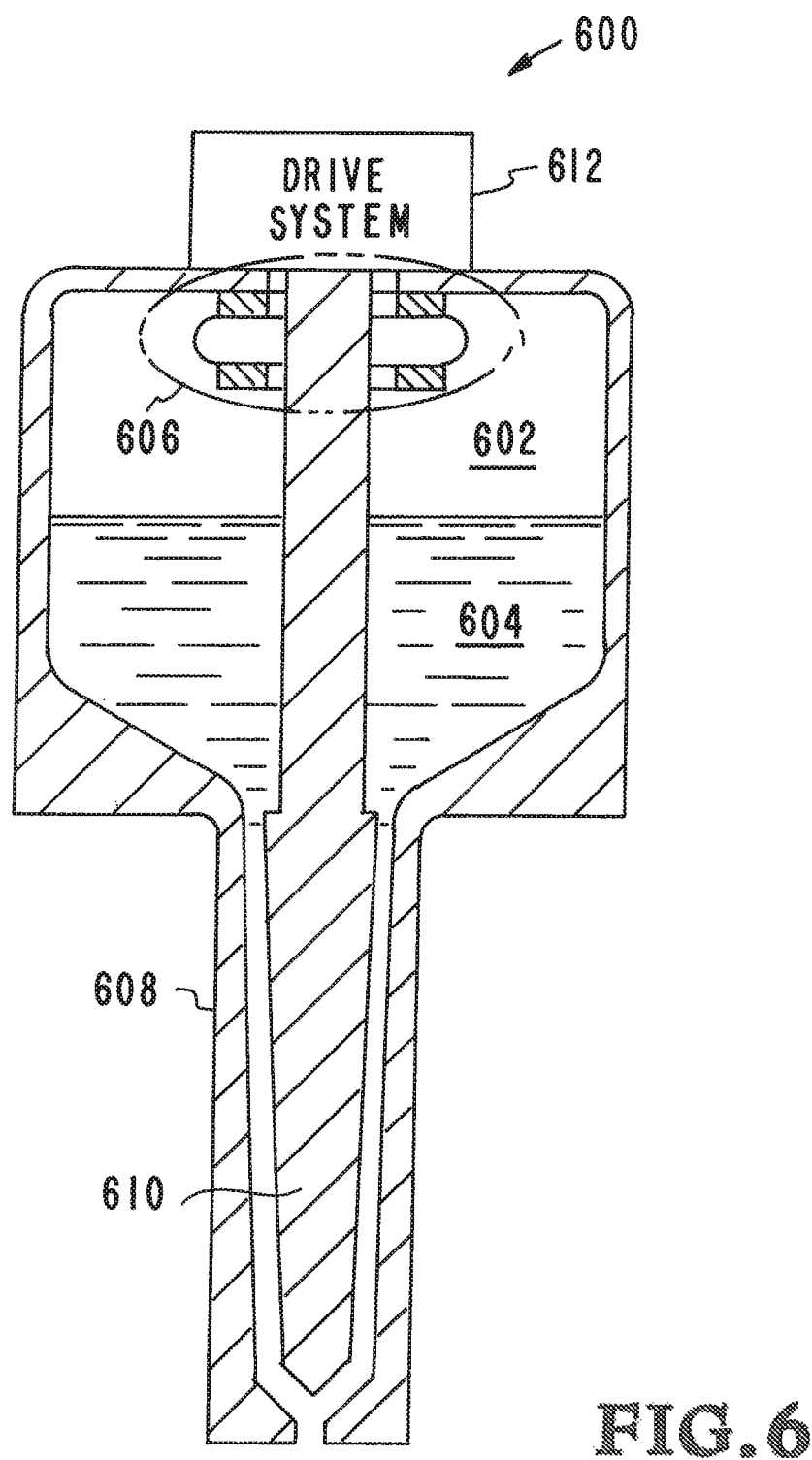
FIG. 6 illustrates another embodiment of the inventor's apparatus, systems, and methods.

Referring now to FIG. 6, a version of the inventors' apparatus, systems, and methods that has use other than in additive manufacturing is illustrated. This version is designated generally by the reference numeral 600. The version 600 can be used for extrusion of cosmetic products (e.g., into their packaging container) which are commonly thixotropic materials. The version 600 can be used for extruding shear-thickening (e.g., cornstarch) food stuffs and allowing the ability to tune the rate of extrusion via spindle rate of motion.

Referring again to FIG. 6 the nozzle system 600 provides direct motion of the agitating body (referred to as a spindle 610) into a non-rotating circular pattern. A thixotropic materials chamber 602 connected to the nozzle system contains materials 604. The materials 604 are shear-thinning and/or thixotropic materials and/or materials requiring mixing/agitating during nozzle extrusion. A multiple degree-of-freedom pivoting unit 606 provides an interface between the spindle 610 and the nozzle 608. The pivoting unit 606 is designated by the dotted line circle. A dive system is connected to the pivoting unit 606.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing apparatus for producing an object, comprising:
    an additive manufacturing print head,
    extruding material in said additive manufacturing print head,
    a nozzle in said additive manufacturing print head that extrudes said extruding material,
    a controller that moves said print head and said nozzle to produce the object,
    an internal spindle in said nozzle that imparts motion into said extruding material, and
    a multiple degree-of-freedom drive mechanism connected to said internal spindle,
    said multiple degree-of-freedom drive mechanism comprising
    a first eccentric hub,
    a first stepper motor connected to said first eccentric hub,
    a first link connecting said first eccentric hub to said internal spindle,
    a second eccentric hub,
    a second stepper motor connected to said second eccentric hub, and
    a second link connecting said second eccentric hub to said internal spindle.

2. The additive manufacturing apparatus for producing an object of claim 1 wherein the material is a semi-solid metal or alloy.

3. The additive manufacturing apparatus for producing an object of claim 1 wherein the material is a shear thinning mixture or material.

4. The additive manufacturing apparatus for producing an object of claim 1 wherein the material is a thixotropic mixture or material.

5. The additive manufacturing apparatus for producing an object of claim 1 wherein said multiple degree-of-freedom drive mechanism is a flexural multiple degree-of-freedom drive mechanism.

6. The additive manufacturing apparatus for producing an object of claim 1 wherein said spindle has a diameter and a length and wherein said diameter varies along said length.

7. The additive manufacturing apparatus for producing an object of claim 1 wherein said multiple degree-of-freedom drive mechanism constrains said spindle against axial rotation and allows oscillation of said spindle.

* * * * *